Sept. 14, 1943.　　　LE ROY W. GRAHAM　　　2,329,347
CALF FEEDER
Filed June 4, 1941

INVENTOR.
LEROY W. GRAHAM.
BY Oltsch & Knoblock
Attorneys.

Patented Sept. 14, 1943

2,329,347

UNITED STATES PATENT OFFICE 2,329,347

CALF FEEDER

Le Roy W. Graham, German Township, St. Joseph County, Ind.

Application June 4, 1941, Serial No. 396,490

4 Claims. (Cl. 119—71)

This invention relates to improvements in calf feeders, and more particularly to a device by which young calves may be fed while being weaned and before the calves reach the age when they are able properly to feed upon materials positioned below normal head height.

Heretofore, it has been the conventional practice of dairymen and farmers who desire to obtain the milk of a cow as soon as possible for sale upon the market, to wean the calf from its mother by feeding it from a pail. This practice frequently leads to digestive disorders in the calf by reason of the inability of the calf to properly digest the food. Calves which suffer such digestive disorders are greatly retarded in their development and growth, require care and nursing, and also fail to develop a proper weight for a long period of time after the illness.

Ruminating animals have stomachs divided into various compartments of which the first is a paunch in which the food eaten by the animal is received and stored pending the time when the animal ceases feeding and then regurgitates, chews the food, and passes it into one of the other compartments of the stomach in which the digestive process takes place. Thus, when a calf is fed from a pail, in which event the pail must be placed in a position lower than the animal's head, the milk which it drinks passes into this paunch where it will sour unless passed on to the digestive part of the stomach after regurgitation. It appears that some young calves do not regurgitate naturally at the age when weaned, and hence the milk received within the paunch stays therein, sours, and causes colic and other digestive disorders. On the contrary, where the calf feeds in the normal position with its head elevated, no such digestive disorders occur. Apparently, the reason for this difference is that the elevated or inclined position of the neck of the animal permits the milk to pass directly into one of the digestive portions of the stomach.

Therefore, it is the primary object of this invention to provide a device by means of which a calf may be fed with its head elevated until such time as its physical development permits it to feed upon food which is in a position lower than head height and then properly assimilate and digest the food.

A further object is to provide a device of this character including a flexible container which will yield upon bunting by the calf, and which will substantially prevent overflowing or spilling of the milk during feeding.

A further object is to provide a device of this character adapted to be suspended from a support and having a nipple detachably connected to the lower end of the container of the device to facilitate disassembly of the device for cleaning and sterilizing purposes.

A further object is to provide a device of this character comprising a flexible container, a nipple, and a separable connector having parts carried respectively by the container and the nipple, and having an unobstructed bore through which the milk may pass rapidly by gravity to prevent the taking of wind by the calf during feeding.

A further object is to provide a device of this character having a flexible container open at its upper end and provided with a transversely restricted portion adjacent its upper end to prevent spilling of the milk when the container is compressed, moved or shaken, as incident to bunting thereof by a calf while feeding.

A further object is to provide a device of this character having a flexible container open at its upper end and normally in flat form, wherein registering openings are formed in opposite walls of the container adjacent the open end thereof to fit around a support for suspension of the device from the support with its upper open end in flat substantially closed form, both when empty and when full.

Other objects will be apparent from the description, drawing, and appended claims.

Figure 1:
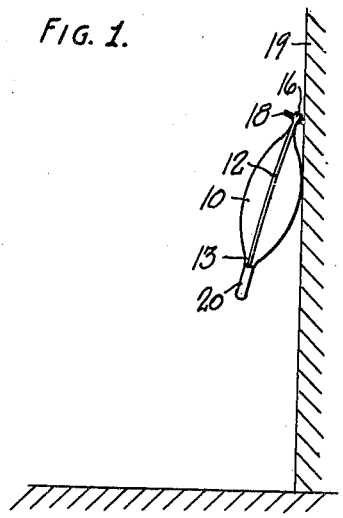
Fig. 1 is a side view illustrating the manner in which the device may be suspended from a support.
Figure 2:
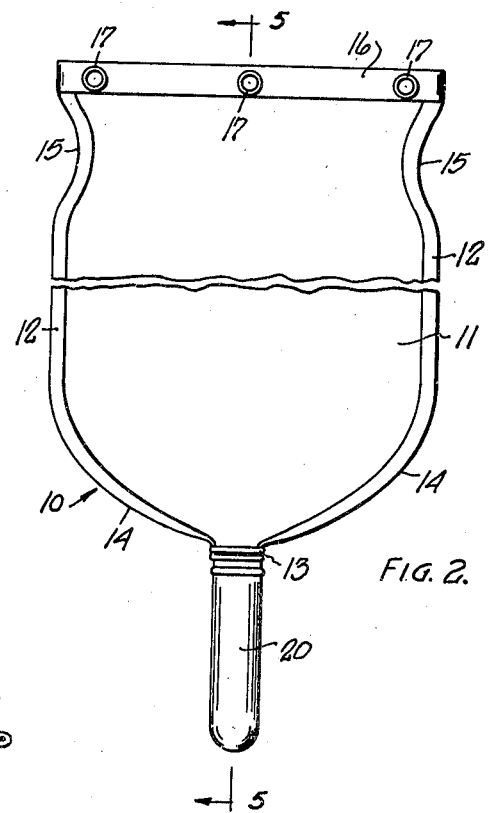
Fig. 2 is a view of the device in side elevation.
Figure 3:
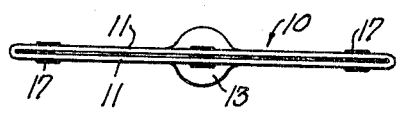
Fig. 3 is a top view of the device.
Figure 4:
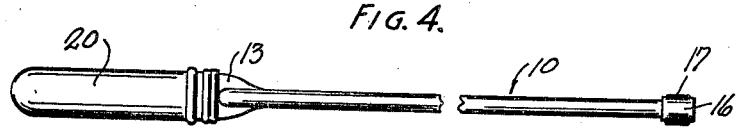
Fig. 4 is a side edge view of the device.

Referring to the drawings, which illustrates the preferred embodiment of the invention, the numeral 10 designates the container portion of the device which is preferably formed of rubber or like flexible material. In the event rubber is employed, the same will be of a thickness preferably slightly greater than the thickness of the inner tube of an automobile tire. The container preferably comprises two complementary side portions 11 normally in flat form and suitably vulcanized at 12 along their longitudinal margins and bottoms. A restricted neck portion 13 is formed at the lower end of the container, and the container is of a shape to converge at said neck 13 by the curved formation of the bottom or lower ends of the walls 11 at 14. Adjacent the upper end of the walls 11, the same are provided with curved inwardly directed edge portions 15 which serve to reduce the transverse dimensions of the container below the upper end thereof.

The upper end of the container is open, is of a width substantially equal to the width of the main body portion of the container, and has a marginal reinforcing band 16 vulcanized or otherwise suitably secured thereto. A plurality of eyelets 17 are mounted in and extend through container walls 11 and the reinforcing portion 16 adjacent the top of the container. The eyelets 17 are preferably arranged in such a manner that each thereof is substantially axially aligned with another eyelet in the opposite wall portion 11 of the container. Thus, in the form illustrated, wherein the container is provided with six eyelets, one aligned set is positioned at the center of the upper end of the container, and the other two aligned sets are positioned adjacent the opposite sides of the container. The eyelets serve as means to suspend the container, in the position illustrated in Fig. 1, from supports 18 in the nature of nails or pegs driven into a wall or other rigid structure 19 in a position substantially above the normal head height of the calf.

An elongated flexible nipple 20, also preferably formed of thick rubber which will tend to maintain a normal extended position and to return to that position after being flexed, is adapted to be connected to the lower end of container 10.

Figure 5:
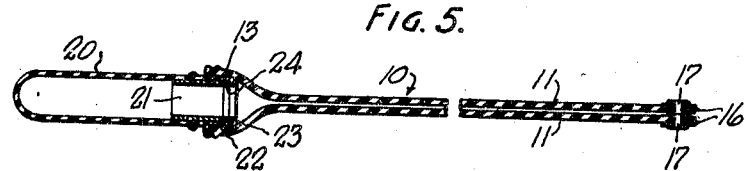
Fig. 5 is a longitudinal transverse sectional view taken on line 5—5 of Fig. 2.

As best illustrated in Fig. 5, the nipple mounts a metal sleeve 21 therein at its open end. Sleeve 21 is preferably of a length to project from the end of the nipple and its projecting portion is screw threaded. The sleeve has a substantially unobstructed bore therethrough of large diameter, and is cemented or otherwise rigidly and fixedly secured in sealed relation within the open end or mouth of the nipple. An internally screw threaded socket member 22 fits within neck 13 of the container and is cemented or otherwise secured or imbedded therein in sealed relation. Socket 22 has an inwardly directed flange 23 at its inner end of a diameter substantially the same as the inner diameter of tube 21, and against which a gasket ring 24 is adapted to seat. It will be understood that the projecting end of the tube 21 bears against the gasket ring 24 to seal the connection between the parts.

In the use of the device the same is filled with milk and is then mounted upon the supports 18 to suspend therefrom. The supports 18 are of such height that when the feeder is suspended therefrom, the nipple 20 will be in a position above the normal head height of a calf. Hence, when the calf is being fed therefrom, its head will be elevated in substantially the same position as the head assumes normally when the calf is being fed by its mother.

The flexible character of the device is such that bunting by the calf will be fully accommodated, and there is not any danger of overturning the container or spilling the milk therefrom. There will be a tendency during bunting of the container by the calf for a certain portion of the milk to spill but this is largely restrained or prevented by the reduced neck portion 15 of the container. Neck portion 15 diverts the direction of movement of milk forced upwardly in the container by the bunting in an inward direction to prevent overflow and quickly restore the normal liquid level of the milk within the container, thereby preventing the loss of any substantial amount of milk from the container.

The large diameter and unobstructed character of the bore through the separable connector parts 21—22 permits the milk to flow rapidly from the container into the nipple 20 by gravity. Hence, if the calf bites, presses upon and squeezes the nipple in feeding, so that some of the milk is forced upwardly out of the nipple and the flow of the milk into the nipple is restricted, the milk will flow back into the nipple as soon as the bite of the calf upon the nipple is released. It will be obvious that this free flow of the milk is also facilitated by the thick self-shaping character of the material forming the nipple, so that the same will always tend to quickly resume its normal position after being compressed. Hence, the possibility that the calf will take on wind in feeding by reason of an inadequate rate of flow of milk into the nipple is substantially avoided.

The separable connection of the parts facilitates disassembling for cleaning and sterilizing thereof, and accommodates full access to all parts by the use of a regular cleaning brush or swab.

The normally flat form of the container of the device is also notably advantageous. Thus, even when the container is filled, the upper end thereof will tend to assume a flat substantially closed form as best illustrated in Fig. 1. Also, the fact that the device is suspended at a plurality of points by means of the aligned eyelets 17 tends to hold the upper end of the container closed. The closed condition of the container has several advantages, including the exclusion of dirt from the container, and avoidance or substantial elimination of spilling or overflow of the milk from the container during bunting by the calf. The flexible character of the container coupled with its normal flat form provide an additional advantage in positioning the nipple 20 spaced from the wall or other structure 19 from which the device is suspended, as illustrated in Fig. 1, in a manner to permit the calf to readily take the nipple.

I claim:

1. A calf feeder comprising a flexible container open at its upper end and having registering openings in opposite walls adapted to fit around a support for the suspension of the container therefrom, said container being normally in flat form and including complementary marginally interconnected flat side portions, said side portions having opposite side edges having intermediate inwardly curved portions adjacent the upper ends thereof to form a restricted neck, a nipple, and rigid means for detachably connecting said nipple to the bottom of said container.

2. A calf feeder comprising a normally flat flexible container open at its upper end, a reinforcing band secured to the upper margin of said container, a pair of eyelets secured to and extending through opposite walls of said container and said band in axial alignment, said container having a reduced dimension neck portion intermediate its length and adjacent its upper end, a nipple formed of thick walled resilient material having substantial deformation-resisting properties, and rigid means for detachably connecting said nipple to the lower end of said container.

3. A calf feeder comprising a flexible liquid container normally in flat form, said container being open at its upper end and having a restricted open neck in its lower end, a flexible nipple open at one end and formed of thick walled resilient material having substantial deformation-resisting properties, a rigid two part separable connector, one connector part being secured in sealed relation in the open end of said nipple and the other in the neck of said container, said container having registering apertures adjacent its upper open end adapted to fit on a support from which said container may be suspended, the container walls at the apertured open end of said container being of increased thickness to retain flat substantially closed position when suspended at said apertures.

4. A calf feeder comprising a flexible liquid container normally in flat form and having an open upper end of increased wall thickness, a pair of eyelets secured to the upper ends of opposite increased thickness side portions of said container in substantially axial alignment and adapted to fit around a support to suspend the container with its upper end substantially closed, a nipple, and a rigid two-part separable connector, one connector part being secured to and depending from the bottom of said container and the other part being carried by the open end of said nipple.

LE ROY W. GRAHAM.